(12) United States Patent
Malinowski et al.

(10) Patent No.: US 11,363,434 B1
(45) Date of Patent: Jun. 14, 2022

(54) INTER-VEHICLE COMMUNICATION

(71) Applicant: International Business Machines Corporation, Armonk, NY (US)

(72) Inventors: Jason Malinowski, Mahopac, NY (US); Cheranellore Vasudevan, Bastrop, TX (US); Swaminathan Balasubramanian, Troy, MI (US); Thomas G. Lawless, III, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/123,163

(22) Filed: Dec. 16, 2020

(51) Int. Cl.
*H04W 4/46* (2018.01)
*H04L 51/046* (2022.01)
*H04W 4/80* (2018.01)
*G08G 1/0967* (2006.01)
*G08G 1/09* (2006.01)
*H04L 67/50* (2022.01)

(52) U.S. Cl.
CPC .............. *H04W 4/46* (2018.02); *G08G 1/093* (2013.01); *G08G 1/09675* (2013.01); *G08G 1/096791* (2013.01); *H04L 51/046* (2013.01); *H04L 67/22* (2013.01); *H04W 4/80* (2018.02)

(58) Field of Classification Search
CPC .......... H04W 4/46; H04W 4/80; G08G 1/093; G08G 1/09675; G08G 1/096791; H04L 51/046; H04L 67/22
See application file for complete search history.

(56) References Cited

U.S. PATENT DOCUMENTS

| 7,751,945 | B2 | 7/2010 | Obata |
| 8,738,238 | B2 | 5/2014 | Rekow |
| 9,355,423 | B1 | 5/2016 | Slusar |
| 2009/0076342 | A1 | 3/2009 | Amurthur |
| 2018/0322785 | A1* | 11/2018 | Jerichow ............. G08G 1/0141 |
| 2019/0206253 | A1 | 7/2019 | Amano |
| 2020/0122744 | A1 | 4/2020 | Badigannavar |
| 2021/0116517 | A1* | 4/2021 | Snook, II ................ H04L 67/22 |

FOREIGN PATENT DOCUMENTS

| CN | 107240056 A | 10/2017 |
| FR | 3063556 A1 | 9/2018 |
| WO | 2019026076 A1 | 2/2019 |

* cited by examiner

*Primary Examiner* — Brian Whipple
(74) *Attorney, Agent, or Firm* — William H. Hartwell; Aaron N. Pontikos

(57) ABSTRACT

A tool for inter-vehicle communication. The tool determines whether contextual data and journey information for a user justifies a notification. Responsive to a determination that the contextual data and the journey information justifies the notification, the tool generates the notification. The tool generates a trust score for the notification. The tool determines one or more vehicles located within a pre-defined proximity of the user. The tool transmits the notification and the trust score to the one or more vehicles located within the pre-defined proximity of the user.

17 Claims, 3 Drawing Sheets

INTER-VEHICLE COMMUNICATION

BACKGROUND OF THE INVENTION

The present invention relates generally to electronic communications, and more particularly to inter-vehicle communication.

While operating a motor vehicle, there are often situations that arise that can have an impact on nearby motor vehicles, such as a motorist making an abrupt emergency exit from a highway, a disabled motor vehicle traveling at a slower speed, or an accident ahead that causes increased congestion on a roadway. In some instances, these situations can increase a likelihood of a motor vehicle accident, or cause other motorists to become frustrated and agitated. Traditional ways of communicating these situations to fellow motorists include activating hazard lights on a motor vehicle, using visible hand gestures, and conversing loudly with a motorist in a nearby motor vehicle.

SUMMARY

Aspects of an embodiment of the present invention disclose a method, computer program product, and computer system for providing inter-vehicle communication. The method includes determining, by the one or more computer processors, whether contextual data and journey information for a user justifies a notification. Responsive to a determination that the contextual data and the journey information justifies the notification, the method includes generating, by the one or more computer processors, the notification. The method includes generating, by the one or more computer processors, a trust score for the notification. The method includes determining, by the one or more computer processors, one or more vehicles located within a pre-defined proximity of the user. The method includes transmitting, by the one or more computer processors, the notification and the trust score to the one or more vehicles located within the pre-defined proximity of the user.

DETAILED DESCRIPTION

Embodiments of the present invention recognize that while operating a motor vehicle, there are many situations where a driver would like to communication a specific situation or driving condition to nearby motorists. Embodiments of the present invention further recognize that communicating personal situations and conditions with nearby motorists is often difficult, as one-to-one communication channels between neighboring motor vehicles have not been widely adopted, and publicly displaying gestures between motorists is often not effective. Embodiments of the present invention further recognize that peer-to-peer communication channels between drivers (e.g., voice calls, text, etc.) are similarly ineffective as these channels would require a driver to personally know the other driver, and would further distract the driver while operating a motor vehicle.

Embodiments of the present invention provide the capability to enable near field communications between a first motor vehicle and one or more additional motor vehicles, generate coded messages related to specific driving situations encountered by a user in the first motor vehicle, and transmit the coded messages to the one or more additional motor vehicles located within a pre-determined proximity to the first motor vehicle. Embodiments of the present invention provide the capability to automatically determine intention information related to a coded message, generate a trust score for the intention information, and transmit the intention information and the trust score along with the coded message to one or more recipients located within a pre-determined proximity of the user. Embodiments of the present invention provide the capability to enable inter-vehicle communication to improve driver safety by utilizing pre-existing navigation information and data related to contextual situations from a first motor vehicle to generate notifications that are delivered to one or more additional motor vehicles in proximity to the first motor vehicle. Embodiments of the present invention provide the capability for one or more additional motor vehicles to acknowledge receipt of the notification automatically or through driver input.

Implementation of such embodiments may take a variety of forms, and exemplary implementation details are discussed subsequently with reference to the Figures.

Figure 1:
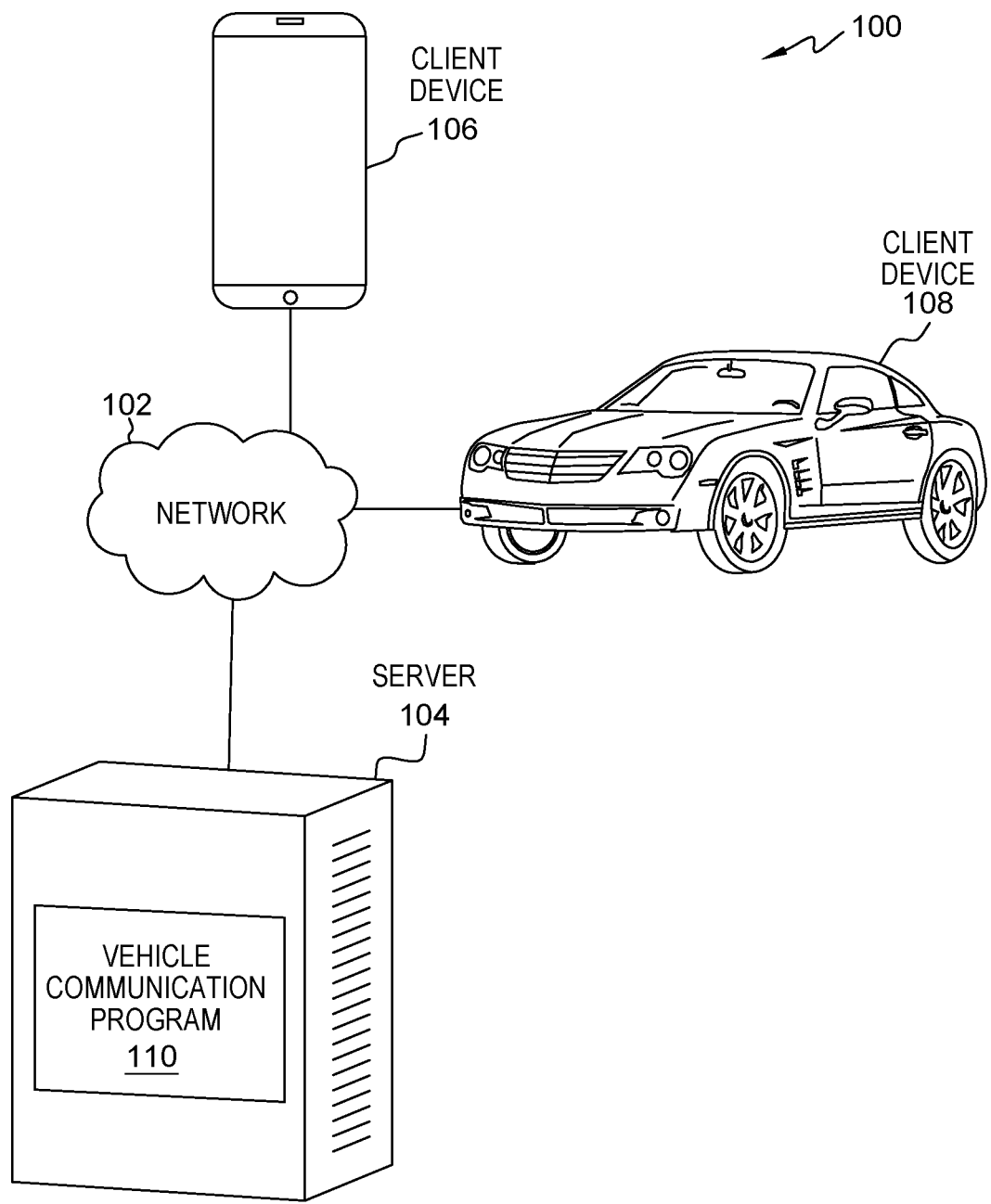
FIG. 1 illustrates a data processing environment, generally designated 100, in accordance with an embodiment of the present invention.

Referring now to various embodiments of the invention in more detail, FIG. 1 is a functional block diagram that illustrates a data processing environment, generally designated 100, suitable for providing intelligent inter-vehicle communication, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and two or more client devices, such as client device 106 and client device 108.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, and client device 108 are interconnected by network 102. Network 102 can be any combination of connections and protocols capable of supporting communications between server 104, client device 106, client device 108 and vehicle communication program 110. Network 102 can be, for example, a telecommunications network, a local area network (LAN), a virtual local area network (VLAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information. In general, network 102 may be any combination of connections and protocols that will support communications between server 104, client device 106, client device 108, and vehicle communication program 110, as well as other computing devices (not shown) within data processing environment 100. FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In one embodiment, server 104 includes vehicle communication program 110 for providing intelligent inter-vehicle communication service on a client device, such as client device 106 and client device 108.

In one embodiment, vehicle communication program 110 operates on a central server, such as server 104, and can be utilized by one or more client devices, such as client device 106 and client device 108, via an application download from the central server or a third-party application store, and executed on the one or more client devices. In another embodiment, vehicle communication program 110 may be software, downloaded from a central server, such as server 104, and installed on one or more client devices, such as client device 106 and client device 108. In yet another embodiment, vehicle communication program 110 may be utilized as a software service provided by a third-party cloud service provider (not shown). In yet another embodiment, vehicle communication program 110 may include one or more components, such as add-ons, plug-ins, and agent programs, etc. (not shown), installed on one or more client devices, such as client device 106 and client device 108, to enable intelligent inter-vehicle communication. In one embodiment, vehicle communication program 110 can be an add-on feature for a conventional navigation system (not shown), where the add-on feature enables a user to enable intelligent inter-vehicle communication with surrounding motor vehicles. In one embodiment, vehicle communication program 110 can be fully integrated with a navigation system. In some embodiments, vehicle communication program 110 may be partially integrated or separate from a conventional navigation system. In one embodiment, vehicle communication program 110 may be an application, downloaded from an application store or third party provider, capable of being used in conjunction with an existing conventional navigation system on a client device, such as client device 106 and client device 108, to provide an intelligent inter-vehicle communication service.

In one embodiment, vehicle communication program 110 can be utilized by a client device, such as client device 106 and client device 108, to enable intelligent inter-vehicle communication that promotes friendly driving, reduces motor vehicle accidents, and assists during emergencies. In one embodiment, vehicle communication program 110 provides the capability to communicate encrypted coded messages between two or more directionally determined motor vehicles within a pre-determined proximity. In one embodiment, vehicle communication program 110 can send coded empathetic requests between drivers and receive corresponding responses. In one embodiment, vehicle communication program 110 can extend inter-vehicle communication to include transmitting warning messages at specific locations as one or more motor vehicles approach the locations (e.g., flooded roadway, accident ahead, etc.). In one embodiment, vehicle communication program 110 provides the capability to ensure privacy during inter-vehicle communication utilizing encryption and keeping destination details and other personal information for a requesting driver and a receiving driver secure. In one embodiment, vehicle communication program 110 provides the capability to validate a coded message (e.g., a request, a warning, a contextual situation description, a vehicle condition description, etc.) using collaborative data sources and historical request data to generate a trust score (i.e., a credibility score). In one embodiment, vehicle communication program 110 determines a measure of credibility in the veracity of a coded message, and transmits the measure of credibility along with the coded message for consideration by a recipient driver. In one embodiment, vehicle communication program 110 provides the capability to automatically determine one or more motor vehicles to receive a coded message based on a proximity to a first motor vehicle, a travel direction for the one or more motor vehicles relative to the first motor vehicle, and contextual data relative to the first motor vehicle.

In one embodiment, vehicle communication program 110 may be configured to access various data sources, such as a database or repository (not shown), that may include personal data, content, contextual data, or information a user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In one embodiment, vehicle communication program 110 enables the authorized and secure processing of personal data. In one embodiment, vehicle communication program 110 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In one embodiment, vehicle communication program 110 provides information regarding personal data and the nature (e.g., type, scope, purpose, duration, etc.) of the processing. In one embodiment, vehicle communication program 110 provides a user with copies of stored personal data. In one embodiment, vehicle communication program 110 allows the correction or completion of incorrect or incomplete personal data. In one embodiment, vehicle communication program 110 allows the immediate deletion of personal data.

In one embodiment, client device 106 and client device 108 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device capable of connecting to a network, such as network 102, to access the Internet, utilize location services, utilize a navigation system, and utilize software applications. In another example, client device 106 and client device 108 may be an on-board computer within a motor vehicle. In one embodiment, client device 106 and client device 108 may be any suitable type of client device capable of executing one or more applications, including a smart phone, tablet, slate, or any type of device that utilizes a mobile operating system. In one embodiment, client device 106 and client device 108 may include a user interface (not shown) for providing a user with the capability to interact with vehicle communication program 110. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, client device 106 and client device 108 may be any wearable electronic devices, including wearable electronic devices affixed to eyeglasses and sunglasses, helmets, wristwatches, clothing, wigs, tattoos, embedded devices, and the like, capable of sending, receiving, and processing data. In one embodiment, client device 106 and client device 108 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, client device 106 and client device 108 may be integrated into a vehicle of the user. For example, client device 106 and client device 108 may include a heads-up display (HUDS) integrated into a dashboard of a motor vehicle to project an image on a windshield of the motor vehicle. In general, client device 106 and client device 108 each represent one or more programmable electronic devices or combination of programmable electronic devices capable of executing machine readable program instructions and communicating with other computing devices (not shown) within data processing environment 100 via a network, such as network 102.

Figure 2:
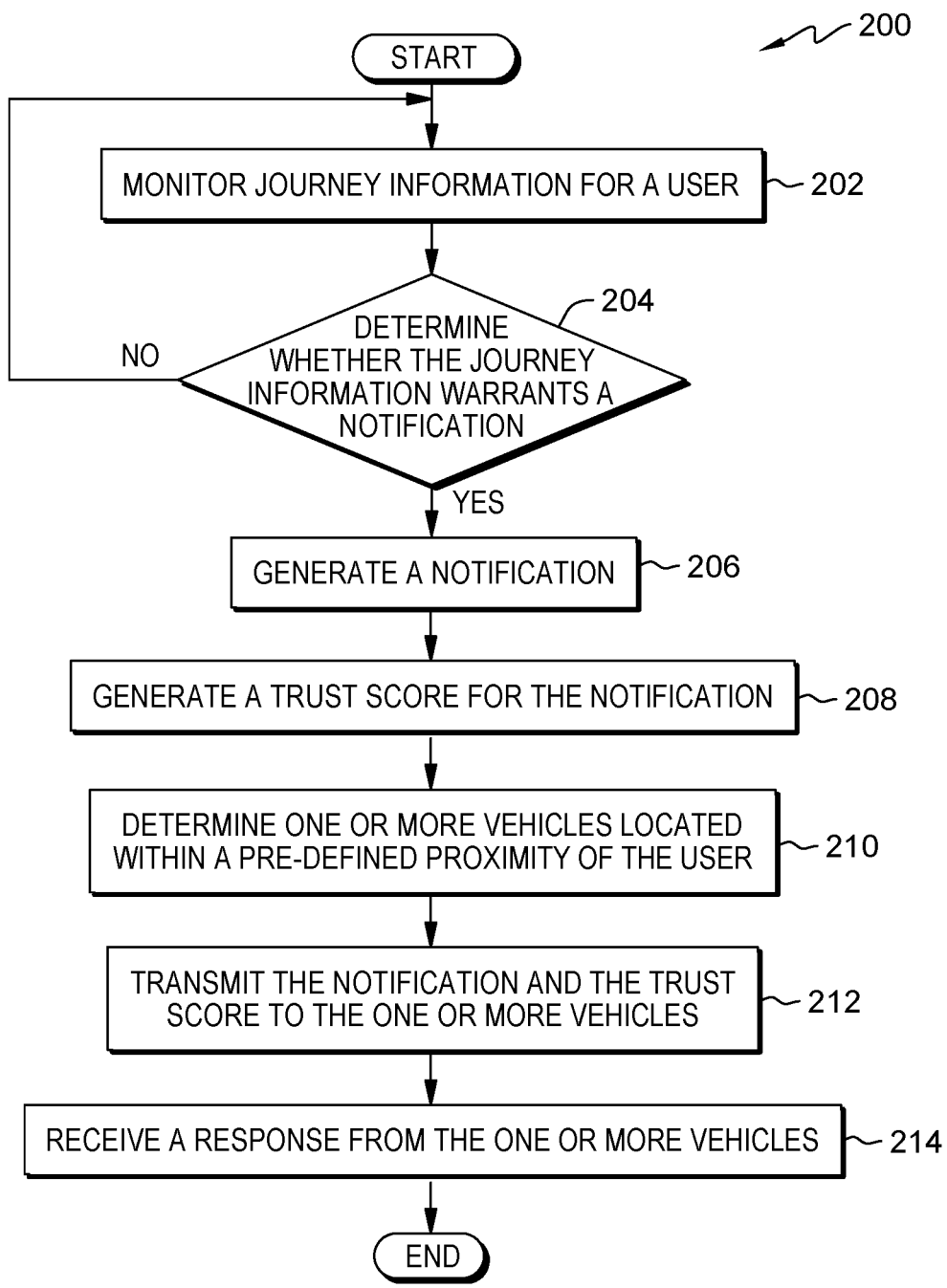
FIG. 2 is a flowchart depicting operational steps of a vehicle communication program, such as the vehicle communication program of FIG. 1, generally designated 200, for providing inter-vehicle communication, in accordance with an embodiment of the present invention.

FIG. 2 is a flowchart depicting operational steps of a vehicle communication program, such as vehicle communication program 110, generally designated 200, for providing inter-vehicle communication, in accordance with an embodiment of the present invention.

Vehicle communication program 110 monitors journey information for a user (202). In one embodiment, vehicle communication program 110 monitors journey information for a user by accessing a client device, such as client device 106 and client device 108, where the client device includes a plurality of vehicle systems, one or more vehicle sensors, a plurality of mobile device systems, and one or more mobile device sensors. In one embodiment, journey information is data related to a journey travelled by a user, and can include relevant data from a navigation map, global positioning system (GPS) coordinates, route directions, an itinerary, appointment information, email, calendars, text messages, call history, direction of travel, weather conditions, etc., and any other information related to traveling in a vehicle, such as speed, a fuel level, and on-board diagnostics. In another embodiment, vehicle communication program 110 monitors contextual information in real-time along with the journey information. In one embodiment, contextual information is data related to speech of a user spoken inside a vehicle. In one embodiment, vehicle communication program 110 accesses an integrated microphone within a vehicle, such as client device 108, and monitors speech of the occupants inside for contextual phrases that relate to the journey information. In one embodiment, vehicle communication program 110 may monitor journey information on a mobile device synced to a vehicle, such as client device 106 synced to client device 108. In one embodiment, vehicle communication program 110 may monitor data related to a journey passively, such as monitoring weather reports periodically while a vehicle is traveling on a journey. In another embodiment, vehicle communication program 110 may monitor data related to a journey actively, such as operating in a manner similarly to a conventional satellite navigation system (i.e., GPS, pings, triangulation, etc.), continuously gathering current GPS coordinates of a vehicle. In one embodiment, vehicle communication program 110 may monitor data related to a journey using a combination of passive and active monitoring, such as monitoring each change in direction along a route, and referencing an itinerary and appointment information for the day stored within a database. In one embodiment, vehicle communication program 110 may prompt a user to pre-authorize access to journey information when the user enters a vehicle, such as client device 108. In one embodiment, vehicle communication program 110 may monitor various driver biometrics (e.g., rate of breathing, heart rate, temperature, etc.) that could indicate stress, fatigue, anxiety, etc.

Vehicle communication program 110 determines whether the journey information justifies a notification (decision block 204). In one embodiment, vehicle communication program 110 determines whether the journey information justifies a notification by determining whether an overlay (e.g., comparison) of current GPS coordinates for the vehicle, such as client device 108, over the journey information indicates a situational change should occur. For example, where vehicle communication program 110 determines that, based on the current GPS coordinates for the vehicle, a first action is to be performed, such as the user will need to switch into a right lane soon to exit, and based on an overlay of the journey information, at least one condition exists that prohibits the first action from being performed, such as a second vehicle is blocking the right lane, vehicle communication program 110 determines that a situational change should occur. In another example, where vehicle communication program 110 determines that, based on the current GPS coordinates for the vehicle, the user will need to switch into a right lane soon to exit, and based on an overlay of the journey information, no vehicles are blocking the right lane, vehicle communication program 110 determines that no situational change should occur at that time. In another embodiment, vehicle communication program 110 determines whether the journey information justifies a notification by determining whether an overlay of contextual information gathered from the vehicle, such as client device 108, over the journey information indicates a situational change should occur. For example, where vehicle communication program 110 determines that, based on the contextual information gathered from the vehicle, a user is speaking phrases that indicate a concern that a second vehicle tailgating, and based on an overlay of the journey information, the second vehicle is not triggering a proximity sensor on a bumper of the vehicle, vehicle communication program 110 determines that no situational change should occur at this time. In another example, where vehicle communication program 110 determines that, based on the contextual information gathered from the vehicle, a user is speaking phrases that indicate a concern that a second vehicle tailgating, and based on an overlay of the journey information, the second vehicle is triggering a proximity sensor on a bumper of the vehicle, vehicle communication program 110 determines that a situational change should occur. Responsive to a determination that a situational change should occur, vehicle communication program 110 determines that the journey information justifies a notification. Conversely, responsive to a determination that a situational change should not occur, vehicle communication program 110 determines that the journey information does not justify a notification.

Responsive to a determination that the journey information does not justify a notification (decision block 204, NO branch), vehicle communication program 110 continues to monitor journey information for a user (202).

Responsive to a determination that the journey information justifies notification (decision block 204, YES branch), vehicle communication program 110 generates the notification (206). In one embodiment, vehicle communication program 110 generates the notification automatically based, at least in part, the contextual information gathered from the vehicle combined with the journey information. In another embodiment, vehicle communication program 110 generates the notification based, at least in part, on user input from dashboard enabled buttons on, for example, a touchscreen integrated within the dashboard. In one embodiment, vehicle communication program 110 generates the notification appropriate for a specific situation (i.e., context) as indicated by the combination of the contextual information gathered from the vehicle and the journey information. In one embodiment, vehicle communication program 110 determines an appropriateness value when generating the notification, where the appropriateness value indicates a type of appropriate notification. For example, vehicle communication program 110 may determine an appropriateness value when generating the notification, such that an appropriate notification is one that would produce a favorable situational change in a specific situation, and in the combination of contextual information and journey information for a requestor. In another example, vehicle communication program 110 determines an appropriateness value when generating the notification, such that an appropriate notification is one that would promote a safe driving environment. In one embodiment, the notifications can include request from a first driver to a second driver, such as "need to switch to the right lane to exit highway, please give way", "need to make an emergency stop, please slow down", "need to get to a hospital, please give way", "need to catch a flight, please give way", etc. In another embodiment, the notifications can include contextual notifications from a first driver to a second driver, such as "disabled/elderly driver, pardon the slow responses", "special luggage on board, pardon the inconvenience", "vehicle in poor condition, pardon the slowness", etc. In one embodiment, vehicle communication program 110 generates notifications utilizing a learned driving pattern for a requester, where patterns of behavior are considered to understand common behaviors of the requester. For example, where a requester is perpetually late due to poor planning, vehicle communication program 110 will learn these behaviors and adjust notifications accordingly. In one embodiment, vehicle communication program 110 generates the notification utilizing one or more user preferences gleaned from a user profile, such as a preference to only generate notifications during a pre-determined period of time (e.g., morning commute).

Vehicle communication program 110 generates a trust score for the notification (208). In one embodiment, vehicle communication program 110 generates a trust score for the notification, where the trust score is a measure of credibility and authenticity for the notification. In one embodiment, vehicle communication program 110 generates the trust score for the notification by utilizing a blockchain system to analyze gathered journey information and contextual information, as well as other environmental or situational conditions to provide justification for the notification, as well as to confirm the veracity of the notification. In one embodiment, vehicle communication program 110 may access a compiled ledger of current and prior inter-vehicle communications (i.e., notifications and responses) around a pre-determined location to ensure the notification is not fraudulent. In one embodiment, vehicle communication program 110 generates the trust score for the notification utilizing pattern verification of all gathered information to ensure a user is not claiming the existence of a situational condition where the situational condition does not exist. For example, where a requester is claiming the existence of an accident on a highway as a reason to notify other motor vehicle operators to slow down, vehicle communication program 110 may utilize pattern verification to determine that the other motor vehicle operators have similarly indicated the accident on the highway, and in turn, vehicle communication program 110 will generate a trust score for the notification that supports the credibility of the notification.

In one embodiment, vehicle communication program 110 collects additional data points from external sources in a blockchain system, such as biometric and human behavior data for a requester from a wearable electronic device, and other environmental conditions including weather events and vehicle diagnostics (a current fuel level, a battery charge level, a general system check, etc.) from one or more dedicated applications. In one embodiment, external sources may include one or more sources participating in a trusted network with vehicle communication program 110, such as an airline service provider, a rental car provider, a travel agency, and a vehicle insurance company, etc. In one embodiment, vehicle communication program 110 generates the trust score for the notification by analyzing a plurality of verifiable data using blockchain technology to prove or disprove intent of a requester, and assigning weighed rating that indicate the veracity of a request. In one embodiment, vehicle communication program 110 generates the trust score for the notification as a weighted rating from 1-10, with a rating of 1 being assigned to a request associated with no verifiable information, and a rating of 10 being assigned to a request associated with verifiable information exceeding a pre-determined threshold.

Vehicle communication program 110 determines one or more vehicles located within a pre-defined proximity of the user (210). In one embodiment, vehicle communication program 110 determines one or more vehicles located within a pre-defined proximity of the user by determining a direction of travel of the user (using GPS coordinates). In one embodiment, vehicle communication program 110 utilizes a combination of contextual information and journey information to determine spatially one or more vehicles that are located within a pre-defined proximity of the user. In one embodiment, the pre-defined proximity can be defined by the combination of contextual information, journey information, GPS coordinates, and route guidance to an end destination. For example, where a user indicates an accident at an off ramp of a highway, vehicle communication program 110 may determine one or more vehicles located up to a quarter mile behind the user that will be traveling a similar route to an end destination are located within a pre-defined proximity of the user. In another example, where a user indicates that a vehicle is tailgating, vehicle communication program 110 may determine one or more vehicles located directly behind the user, that are additionally activating a rear proximity sensor of a vehicle operated by the user, are located within a pre-defined proximity of the user. In yet another example, where a user indicates that lane change into a right lane to take an exit needs to be made, vehicle communication program 110 may determine one or more vehicles located in the right lane, that are additionally activating a side proximity sensor of a vehicle operated by the user, are located within a pre-defined proximity of the user. In one embodiment, vehicle communication program 110 may determine a plurality of vehicles that are within a range (i.e., activating) of one or more proximity sensors on a vehicle of a user, and continuously maintain a list of the plurality of vehicles, such that one or more vehicles that leave the range of the one or more proximity sensors are removed from the list, and one or more vehicles that enter the range of the one or more proximity sensors are added to the list.

Vehicle communication program 110 transmits the notification and the trust score to the one or more vehicles (212). In one embodiment, vehicle communication program 110 transmits the notification and the trust score for the notification to the one or more vehicles located within the pre-defined proximity of the user utilizing near field communication (NFC) technologies. In one embodiment, vehicle communication program 110 may request to pair to the one or more vehicles located within the pre-defined proximity of the user and transmit the notification and trust score for the notification wirelessly via a paired connection. In one embodiment, vehicle communication program 110 may transmit the notification and trust score for the notification automatically based, at least in part, on establishing connection with the one or more vehicles within the pre-defined proximity to the user. In another embodiment, vehicle communication program 110 may transmit the notification and trust score for the notification in response to user input via one or more dashboard enabled buttons. In one embodiment, vehicle communication program 110 may act as a hotspot to facilitate wireless connectivity with the one or more vehicles within the pre-defined proximity to the user. In alternative embodiments, vehicle communication program 110 may transmit the notification and trust score for the notification using any technology known in the art capable of supporting communication between a plurality of vehicles within a pre-defined proximity to one another.

Vehicle communication program 110 receives a response from the one or more vehicles (214). In one embodiment, vehicle communication program 110 receives a response from the one or more vehicles within the pre-defined proximity to the user, where the response from the one or more vehicles informs the user (i.e., requester) of whether or not operators of the one or more vehicles (i.e., recipients) intend to act on the notification.

In another embodiment, where vehicle communication program 110 is operating in the one or more vehicles (i.e., recipients), vehicle communication program 110 may be configured to process notifications automatically based on one or more user preferences. For example, upon receipt of a notification, vehicle communication program 110 may be configured to automatically respond to all incoming notifications, respond to no notifications, and respond to notifications provided responding to the notification does not delay a current trip by more than a pre-determined period of time, etc. In one embodiment, vehicle communication program 110 may be configured to provide the notification to a driver and wait for user input via one or more dashboard enabled buttons or voice command to confirm a response. In one embodiment, vehicle communication program 110 may prompt a driver to make a "yes/no decision" regarding whether to take action based on the request. In yet another embodiment, vehicle communication program 110 may be configured to learn from prior responses to notifications, and based on prior user behavior and response patterns relative to a type of notification, determine a suggested response to be returned to a requesting driver. In one embodiment, vehicle communication program 110 may prompt a recipient to configure a recipient trust score within a user profile, where the recipient trust score is based, at least in part, on a certified history of prior transactions (e.g., received requests/notifications and responses to those received requests/notifications) and recipient behavior history with regard to various received notifications. In one embodiment, vehicle communication program 110 may provide a suggested decision to the recipient based, at least in part, on one or more response preferences for a recipient, a recipient trust score, one or more response preferences, contextual information for the recipient, and journey information for the recipient, where the suggested decision may include a type of response to be sent to a requesting driver (e.g., "yes/no decision" response, automatic response, respond to no notifications, etc.).

In a usage example, a user driving in a first vehicle equipped with vehicle communication program 110 speaks out loud "If only this driver would let me through so I can make the exit", vehicle communication program 110 determines a notification is justified based, at least in part, on a combination of contextual information and journey information, generates a notification and a trust score for the notification, such as "Please give way, need to pass to make the exit, Trust Score 8", determines a second vehicle within a pre-defined proximity of the user, such as the second vehicle directly in front of the user that if moved, would allow the user to pass and make the exit, and transmits the notification and the trust score to the second vehicle. Upon receipt of the notification and the trust score, the second vehicle similarly equipped with vehicle communication program 110, advises an operator of the second vehicle that there would be "No impact on your itinerary if you take the requested action", and provides the operator with a prompt to accept the request. Upon receiving user input to accept the request, vehicle communication program 110 sends a response to the user driving in the first vehicle that the operator in the second vehicle intends to move to allow the pass.

In alternative embodiments, vehicle communication program 110 may provide an optional rewards scheme that encourages empathetic driving behavior, such as with accumulating points for accepting requests or taking action after receiving notifications, where the points could be redeemable for a favor in future traffic situations, rebates at fueling stations, discounts on car insurance, or used as a credit towards traffic fines. In one embodiment, vehicle communication program 110 may utilize a cloud based system managed and hosted by external sources to implement the optional rewards scheme.

Figure 3:
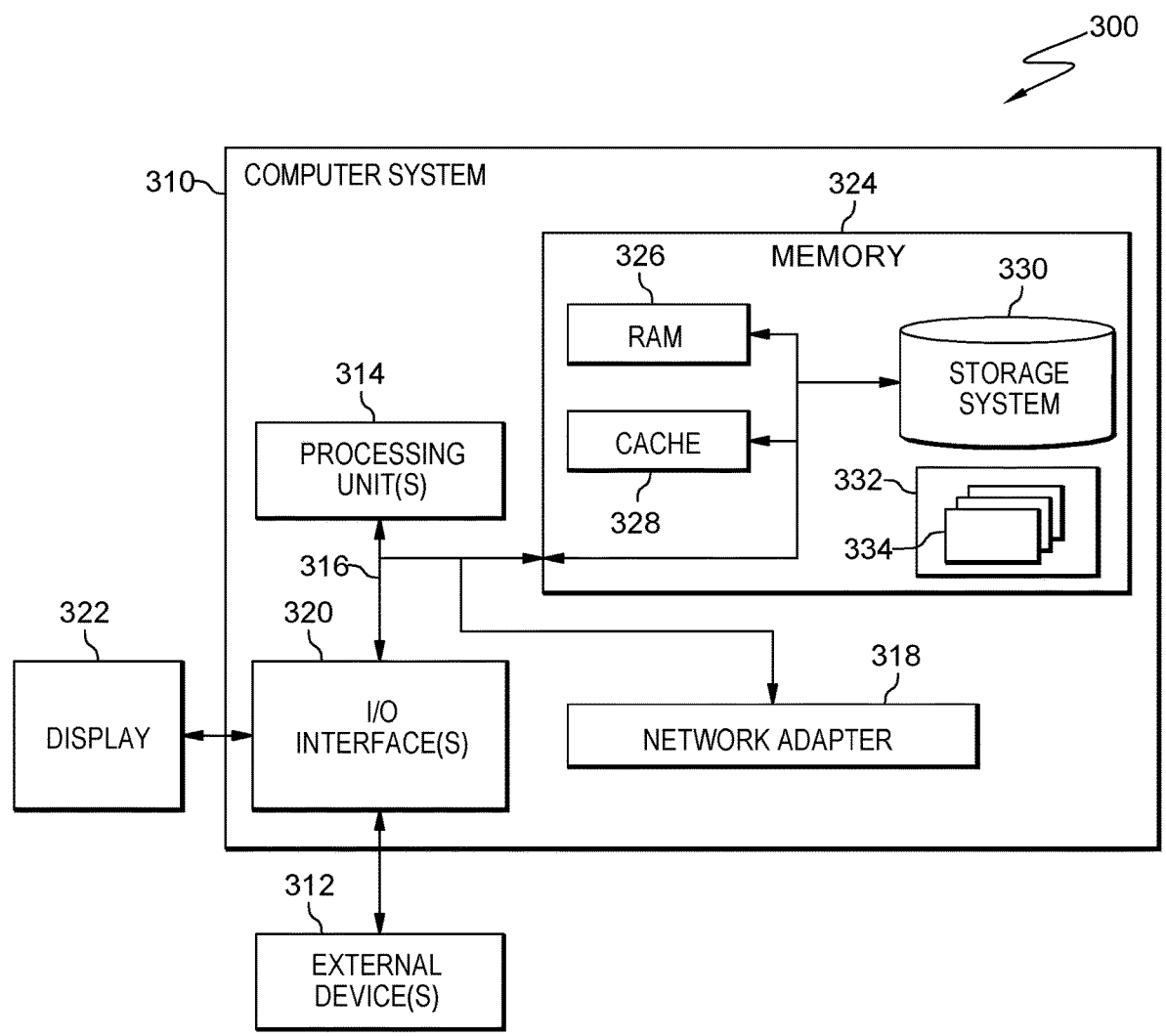
FIG. 3 is a block diagram depicting components of a data processing environment, such as the server of FIG. 1, generally designated 300, in accordance with an embodiment of the present invention.

FIG. 3 is a block diagram depicting components of a data processing environment, such as server 104 of data processing environment 100, generally designated 300, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A computer-implemented method for providing inter-vehicle communication, the method comprising:
    determining, by one or more computer processors, whether contextual data and journey information for a user justify a notification, wherein the contextual data includes contextual phrases, related to one or more driving situations, spoken by the user while inside a vehicle;
    responsive to a determination that the contextual data and the journey information justify the notification, generating, by the one or more computer processors, the notification;
    generating, by the one or more computer processors, a trust score for the notification;
    determining, by the one or more computer processors, one or more vehicles located within a pre-defined proximity of the user; and
    transmitting, by the one or more computer processors, the notification and the trust score to the one or more vehicles located within the pre-defined proximity of the user.

2. The method of claim 1, further comprising:
    monitoring, by the one or more computer processors, a client device of the user for the contextual data and the journey information, wherein the client device of the user includes a mobile device connected to a plurality of vehicle systems, one or more vehicle sensors, and one or more mobile device sensors.

3. The method of claim 1, wherein the journey information for the user is data related to a journey traveled by the user, including, but not limited to, relevant data from a navigation map, global positioning system coordinates, route directions, an itinerary, appointment information, an email, a calendar, a text message, a call history, a direction of travel, a weather condition, a vehicle speed, a vehicle fuel level, and on-board diagnostics from the vehicle.

4. The method of claim 1, wherein determining whether the contextual data and the journey information justify the notification further comprises:

determining, by the one or more computer processors, whether an overlay of global positioning system coordinates for a client device of the user with the journey information and the contextual data indicate that a situational change should occur; and wherein the situational change includes, but is not limited to, a change in position of the client device of the user relative to the journey information and the contextual data.

5. The method of claim 4, further comprising:

determining, by the one or more computer processors, that the situational change should occur when a first action to be performed is prohibited by at least one situational condition.

6. The method of claim 1, wherein generating the notification further comprises:

determining, by the one or more computer processors, an appropriateness value that indicates an appropriate notification; and generating, by the one or more computer processors, the appropriate notification for a specific situation, based, at least in part, on the appropriateness value and a comparison of the contextual data and the journey information, wherein the appropriate notification produces a situational change in the specific situation.

7. The method of claim 1, wherein generating the trust score for the notification further comprises:

analyzing, by the one or more computer processors, a plurality of verifiable data utilizing pattern verification to prove the notification is not fraudulent; and assigning, by the one or more computer processors, a weighed rating that indicates the notification is associated with verifiable information exceeding a pre-determined threshold.

8. A computer program product for providing inter-vehicle communication, the computer program product comprising:

one or more computer readable storage media and program instructions stored on the one or more computer readable storage media, the stored program instructions comprising:

program instructions to determine whether contextual data and journey information for a user justify a notification, wherein the contextual data includes contextual phrases, related to one or more driving situations, spoken by the user while inside a vehicle;

program instructions to, responsive to a determination that the contextual data and the journey information justify the notification, generate the notification;

program instructions to generate a trust score for the notification;

program instructions to determine one or more vehicles located within a pre-defined proximity of the user; and program instructions to transmit the notification and the trust score to the one or more vehicles located within the pre-defined proximity of the user.

9. The computer program product of claim 8, the stored program instructions further comprising:

program instructions to monitor a client device of the user for the contextual data and the journey information, wherein the client device of the user includes a mobile device connected to a plurality of vehicle systems, one or more vehicle sensors, and one or more mobile device sensors.

10. The computer program product of claim 8, wherein the journey information for the user is data related to a journey traveled by the user, including, but not limited to, relevant data from a navigation map, global positioning system coordinates, route directions, an itinerary, appointment information, an email, a calendar, a text message, a call history, a direction of travel, a weather condition, a vehicle speed, a vehicle fuel level, and on-board diagnostics from the vehicle.

11. The computer program product of claim 8, wherein the program instructions to determine whether the contextual data and the journey information justify the notification further comprise:

program instructions to determine whether an overlay of global positioning system coordinates for a client device of the user with the journey information and the contextual data indicate that a situational change should occur; and wherein the situational change includes, but is not limited to, a change in position of the client device of the user relative to the journey information and the contextual data.

12. The computer program product of claim 11, the stored program instructions further comprising:

program instructions to determine that the situational change should occur when a first action to be performed is prohibited by at least one situational condition.

13. The computer program product of claim 8, wherein the program instructions to generate the notification further comprise:

program instructions to determine an appropriateness value that indicates an appropriate notification; and program instructions to generate the appropriate notification for a specific situation, based, at least in part, on the appropriateness value and a comparison of the contextual data and the journey information, wherein the appropriate notification produces a situational change in the specific situation.

14. The computer program product of claim 8, wherein the program instructions to generate the trust score for the notification further comprise:

program instructions to analyze a plurality of verifiable data utilizing pattern verification to prove the notification is not fraudulent; and program instructions to assign a weighed rating that indicates the notification is associated with verifiable information exceeding a pre-determined threshold.

15. A computer system for providing inter-vehicle communication, the computer system comprising:

one or more computer processors;

one or more computer readable storage media; and program instructions stored on at least one of the one or more computer readable storage media for execution by at least one of the one or more computer processors, the stored program instructions comprising:

program instructions to determine whether contextual data and journey information for a user justify a notification, wherein the contextual data includes contextual phrases, related to one or more driving situations, spoken by the user while inside a vehicle;

program instructions to, responsive to a determination that the contextual data and the journey information justify the notification, generate the notification;

program instructions to generate a trust score for the notification;

program instructions to determine one or more vehicles located within a pre-defined proximity of the user; and program instructions to transmit the notification and the trust score to the one or more vehicles located within the pre-defined proximity of the user.

16. The computer system of claim 15, the stored program instructions further comprising:
program instructions to monitor a client device of the user for the contextual data and the journey information, wherein the client device of the user includes a mobile device connected to a plurality of vehicle systems, one or more vehicle sensors, and one or more mobile device sensors.

17. The computer system of claim 15, wherein the journey information for the user is data related to a journey traveled by the user, including, but not limited to, relevant data from a navigation map, global positioning system coordinates, route directions, an itinerary, appointment information, an email, a calendar, a text message, a call history, a direction of travel, a weather condition, a vehicle speed, a vehicle fuel level, and on-board diagnostics from the vehicle.

* * * * *